United States Patent
Chandramohan et al.

(10) Patent No.: US 6,711,619 B1
(45) Date of Patent: Mar. 23, 2004

(54) METHOD, SYSTEM, AND APPARATUS FOR DISTRIBUTING AND USING COMPUTER-BASED APPLICATIONS OVER A NETWORK

(75) Inventors: Bharath Chandramohan, Mountain View, CA (US); Mahesh Ramachandran, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/464,351

(22) Filed: Dec. 15, 1999

(51) Int. Cl.[7] .............................................. G06F 15/16
(52) U.S. Cl. ...................... 709/229; 709/203; 709/219; 709/231; 709/232; 707/10
(58) Field of Search ........................ 709/203, 219–232; 707/10

(56) References Cited

U.S. PATENT DOCUMENTS

| | | | | |
|---|---|---|---|---|
| 5,790,753 A | * | 8/1998 | Krishnamoorthy et al. | 348/461 |
| 5,928,330 A | | 7/1999 | Goetz et al. | |
| 6,014,695 A | * | 1/2000 | Yamashita et al. | 370/351 |
| 6,119,154 A | * | 9/2000 | Weaver et al. | 345/716 |
| 6,260,078 B1 | * | 7/2001 | Fowlow | 709/316 |
| 6,311,221 B1 | * | 10/2001 | Raz et al. | 709/231 |
| 6,356,964 B1 | * | 3/2002 | Mohindra et al. | 707/10 |
| 6,401,126 B1 | * | 6/2002 | Douceur et al. | 370/230 |
| 6,415,373 B1 | * | 7/2002 | Peters et al. | 711/167 |

OTHER PUBLICATIONS

Chandra Krintz et al., "Overlapping Execution with Transfer Using Non–Strict Execution for Mobile Programs", pp. 159–169.

* cited by examiner

Primary Examiner—Zarni Maung
Assistant Examiner—Jinsong Hu
(74) Attorney, Agent, or Firm—Christine H. Smith

(57) ABSTRACT

A method, system, and apparatus for distributing and using portions of a computer-based application over a network, such as the internet. The present embodiment executes streamed chunks of code associated with an application on demand by binary emulation. Therefore the present invention enables execution of applications on network-based computer systems thereby enabling flexible distribution and use of executable code over a network. By streaming the transmission of non-sequentially ordered code chunks the present embodiment enables overlapping of streaming and execution of code chunks and reduces network latency effects of the past. The present embodiment may also speculatively stream the code chunks associated with the application to further reduce network latency effects associated with transmission of the code chunks.

19 Claims, 8 Drawing Sheets

US 6,711,619 B1

METHOD, SYSTEM, AND APPARATUS FOR DISTRIBUTING AND USING COMPUTER-BASED APPLICATIONS OVER A NETWORK

FIELD OF THE INVENTION

The present invention relates generally to a method, system, and apparatus for distributing and using portions of a computer-based application over a network.

BACKGROUND OF THE INVENTION

Currently code associated with an application must be fully available on a computer system prior to execution of the application. It would be useful if code associated with an application could be selectively loaded on a computer system via a network for use during the time when the application is executing the particular code thereby reducing network latency associated with the transfer of code.

Presently, audio and video information may be streamed via a network. This is possible because audio and video information contain only data that is used sequentially. Applications by nature have both code and data that may be used in a non-sequential order. It would be useful if code and data could be streamed via a network in a non-sequential order for use by the application thereby enabling overlapping of access to and transmission of code and data with execution of other code and data.

Further, network-based distribution of an application by a computer system server (server) requires a network-based connection between the computer system client (client) and the server, such as a network file system (NFS) connection. It would be useful if an application could be made available via a network to clients that are not directly connected to servers such as computers connected over the network.

SUMMARY OF THE INVENTION

The present embodiment is a method, system, and apparatus for distributing and using portions of a computer-based application over a network.

The present invention novelly recognizes that often, limited portions of the code associated with an application are needed to execute the application during a particular use of the application. The present embodiment executes streamed chunks of code associated with an application on demand by binary emulation. Therefore the present invention enables execution of applications on network-based computer systems thereby enabling flexible distribution and use of executable code over a network. For example, the present embodiment enables servers to provide applications for binary emulated execution on clients that are not directly connected to the server, such as by an NFS connection.

The present embodiment is a software execution engine that cooperates with an operating system (O.S.) to execute code chunks associated with an application by binary emulation. The present embodiment streams the transmission of non-sequentially ordered code chunks required to execute the application, thereby enabling overlapping of access to and transmission of code chunks with execution of other code chunks. The present embodiment also reduces network latency effects of the past. The present embodiment may also speculatively stream the code chunks associated with the application to further reduce network latency effects associated with transmission of the code chunks. That is, the present embodiment novelly uses speculation to predict the code chunks associated with the application that will be required based on information such as patterns of prior use of the application.

The present invention improves the efficiency of application execution over the past by transferring minimal information between the server and the client thereby reducing the volume of information transferred over a network, such as the internet, during application execution. By means of example, the present invention enables more efficient management of pay-per-transaction application services, such as applications-on-tap.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings, FIG. 1 includes FIG. 1A, FIG. 1B and FIG. 1C.

FIG. 3 includes FIG. 3A and FIG. 3B.

FIG. 4 includes FIG. 4A and FIG. 4B.

DETAILED DESCRIPTION

Figure 1A:
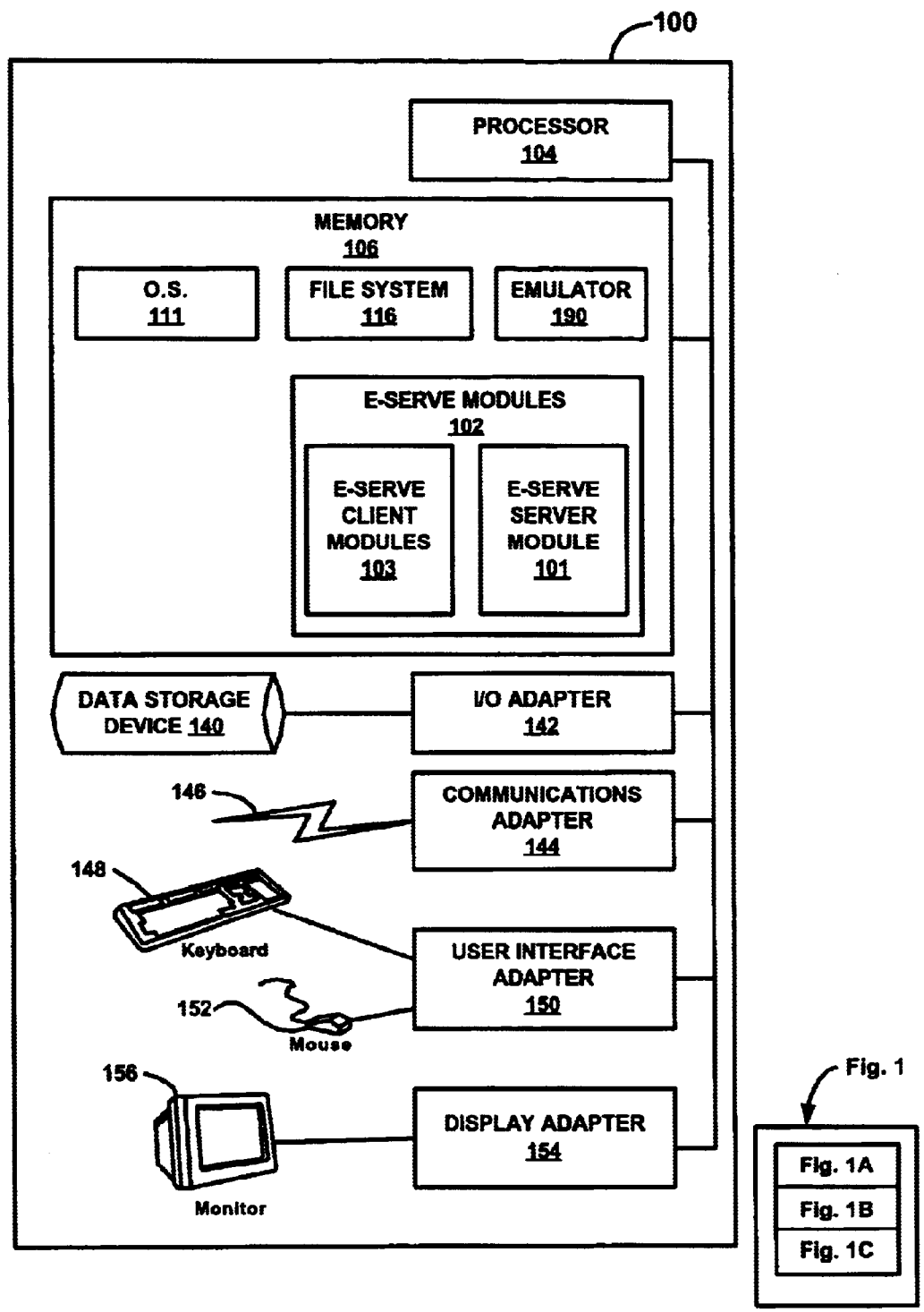
FIG. 1A is a block diagram that illustrates a computer system operating with the present embodiment.

In the following detailed description and in the several figures of the drawings, like elements are identified with like reference numerals.

Figure 2:
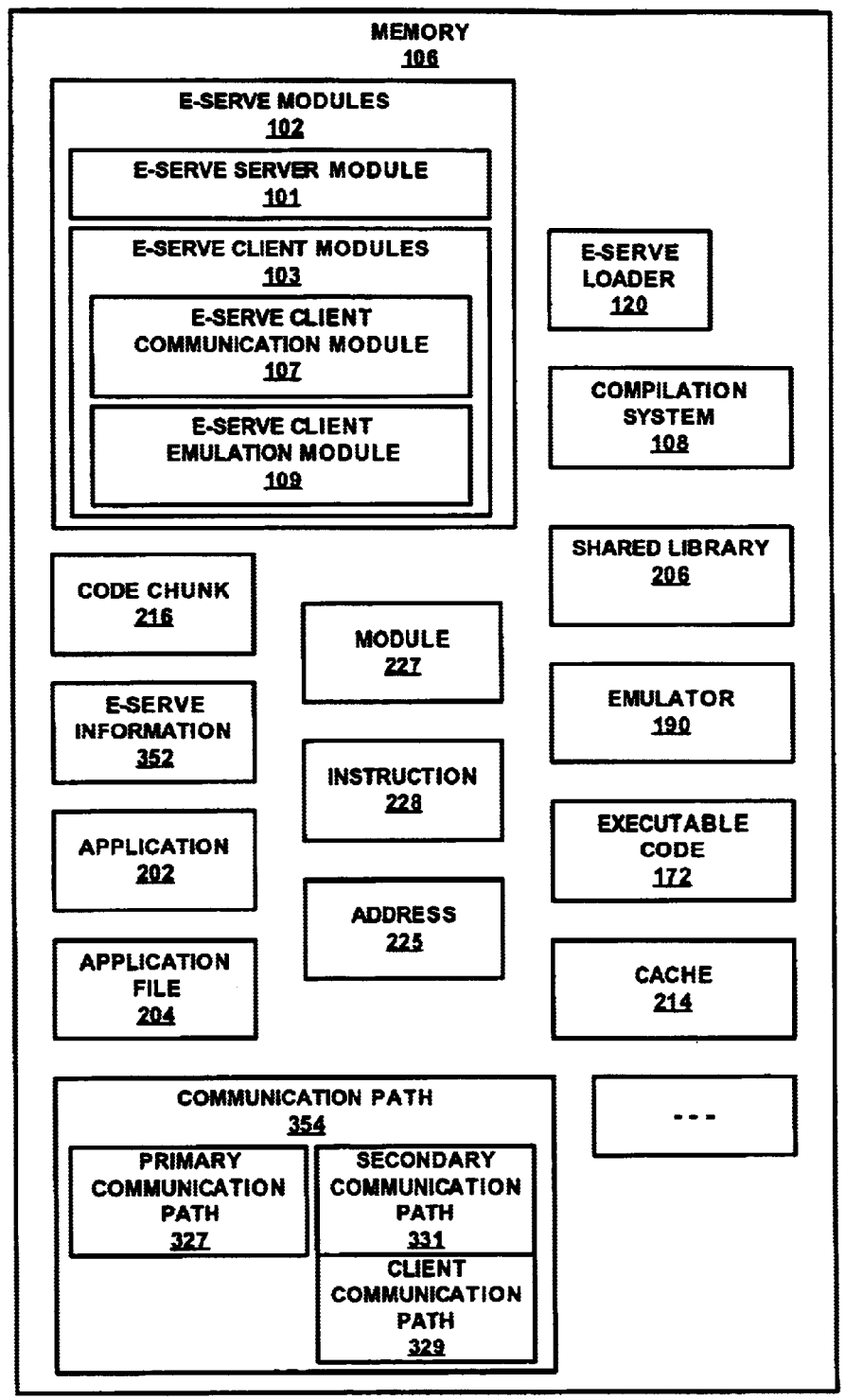
FIG. 2 is a block diagram that illustrates the computer readable memory used by the present embodiment.

Broadly stated, FIG. 1A is a block diagram that illustrates the e-serve modules 102 that operate in a computer system 100 and that distribute and use portions of a computer-based application 202 (as shown in FIG. 2) over a network, such as the internet. More particularly the present embodiment distributes and uses portions of the code associated with an application 202 that are needed to execute the application 202. For example, while an application 202 such as a text editor may include both spell checking and thesaurus features, the spell checker may be primarily used while the thesaurus may be seldom used.

An application 202 may include code and may be executed by an execution engine that operates in cooperation with the code associated with the application 202. An execution engine may be implemented in hardware such as a microprocessor or may be implemented in software. In the present embodiment, the e-serve modules 102 are a software execution engine that streams the transmission of non-sequentially ordered code chunks 216 (as shown in FIG. 2) and that cooperates with an O.S. 111 to execute the code chunks 216 by binary emulation. Thereby the present embodiment enables execution of non-sequentially ordered code chunks 216 that were not executable in the past. The present embodiment also enables execution of applications 202 on network-based computer systems more efficiently than in the past by executing only the code chunks 216 required during the use of the application 202 and by overlapping access to and transmission of code chunks 216 with execution of other code chunks 216.

The terms "chunk" and "code chunk" will be used interchangeably herein and may refer to a block of code, data, or a mixture of code and data. The term "code" refers to instructions 228 (as shown in FIG. 2) or data used by the computer system 100 for the purpose of generating instructions 228 or data that execute in the computer system 100. The term "code block" as used herein refers to a sequence of instructions 228 that execute on a computer system 100. It will be appreciated that the term "execute" refers to the process of manipulating code, such as software or firmware instructions 228, for operation on the computer system 100.

FIG. 1A further represents the computer system 100 that includes components such as a processor 104, memory 106, a data storage device 140, an I/O adapter 142, a communications adapter 144, a communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown. Further, the present embodiment operates by communication between devices that operate over a network 146, such as computer systems 100 that may include a server 194 and a client 192 (as are shown in FIG. 1C).

It will be understood by those skilled in the art that the functions ascribed to the e-serve modules 102, or any of their functional files, typically are performed by a central processing unit that is embodied in FIG. 1A as the processor 104 executing software instructions 228. The processor 104 typically operates in cooperation with software programs such as the operating system (O.S.) 111 and the e-serve modules 102. Henceforth, the fact of such cooperation among the processor 104 and the e-serve modules 102, whether implemented in software, hardware, firmware, or any combination thereof, may therefore not be repeated or further described, but will be understood.

The O.S. 111 may cooperate with a file system 116 that manages the storage of and access to files within the computer system 100. Files may include code such as instructions 228 or data, or code chunks 216. The interaction between the file system 116 and the O.S. 111 will be appreciated by those skilled in the art.

It will also be understood by those skilled in the relevant art that the functions ascribed to the e-serve modules 102 and their functional files, whether implemented in software, hardware, firmware, or any combination thereof, may in some embodiments be included in the functions of the O.S. 111. That is, the O.S. 111 may include files from the e-serve modules 102. In such embodiments, the functions ascribed to the e-serve modules 102 typically are performed by the processor 104 executing such software instructions 228 in cooperation with aspects of the O.S. 111 that incorporate the e-serve modules 102. Therefore, in such embodiments, cooperation by the e-serve modules 102 with aspects of the O.S. 111 will not be stated, but will be understood.

The e-serve modules 102 may be embodied in any computer-readable medium for use by or in connection with an instruction execution system, apparatus, or device, such as a computer system 100 or other system that can access and execute the instructions 228 included in computer-readable program code. In the context of this document, a "computer-readable medium" can be any medium that can contain, store, communicate, propagate, or transport the program for use by or in connection with the instruction execution system, apparatus, or device. The computer-readable medium can be, for example but is not limited to, an electronic, magnetic, optical, electromagnetic, infrared, or semiconductor system, apparatus, device, propagation medium, or computer memory 106. The present embodiment may operate by use of computer-readable program code arranged in order.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the e-serve modules 102 may reside in the memory 106 during execution in the computer system 100. The term "storage" refers herein to computer resources such as the memory 106, and may be used to store data or instructions 228 used in executing a computer program. The O.S. 111 may also reside in the memory 106 when the e-serve modules 102 are operating.

It will be appreciated that an emulator 190 may be included in the computer system 100. The operation of the e-serve client modules 103 that function as a binary emulator 190 is discussed with reference to FIG. 1C.

The e-serve modules 102 include instructions 228 and data that may be referred to as values. The e-serve modules 102 may be implemented in the "C" programming language, although it will be understood by those skilled in the relevant art that other programming languages could be used. Also, the e-serve modules 102 may be implemented in any combination of software, hardware, or firmware.

The data storage device 140 may be any of a variety of known or future devices, including a compact disk drive, a tape drive, a removable hard disk drive, or to a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 148, a mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, program code may typically be loaded through an input device and may be stored on the data storage device 140. A copy of the code or portions of it, may alternatively be placed by the processor 104 into the memory 106 for execution in the computer system 100.

The computer system 100 may communicate with the network 146 through a data transmission communications adapter 144, such as a networking card. The network 146 may be a local area network, a wide area network, the internet, or another known computer network or future computer network. It will be appreciated that the I/O device used by the e-serve modules 102 may be connected to the network 146 through the communications adapter 146 and therefore may not be co-located with the computer system 100. It will be further appreciated that other portions of the computer system 100, such as the data storage device 140 and the monitor 156, may be connected to the network 146 through the communications adapter 144 and may not be co-located.

Figure 1B:
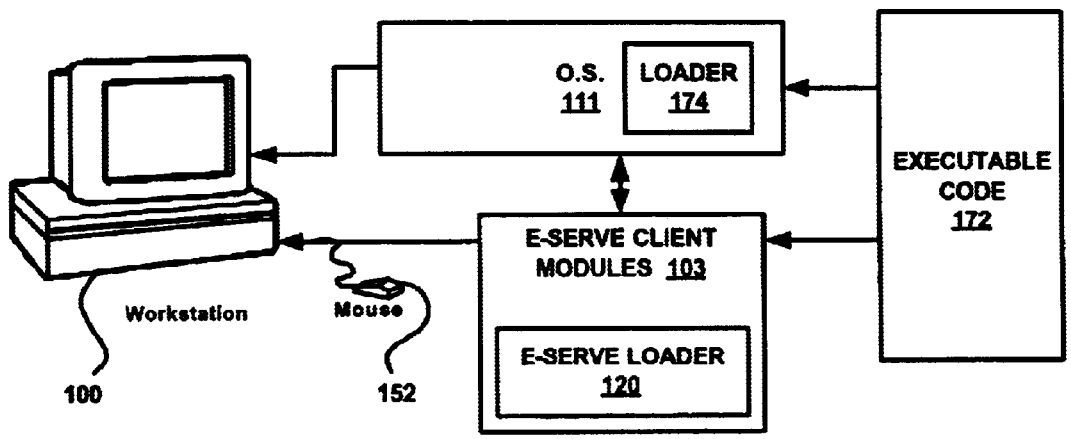
FIG. 1B is a block diagram that illustrates the present embodiment loading and executing executable code.
Figure 1C:
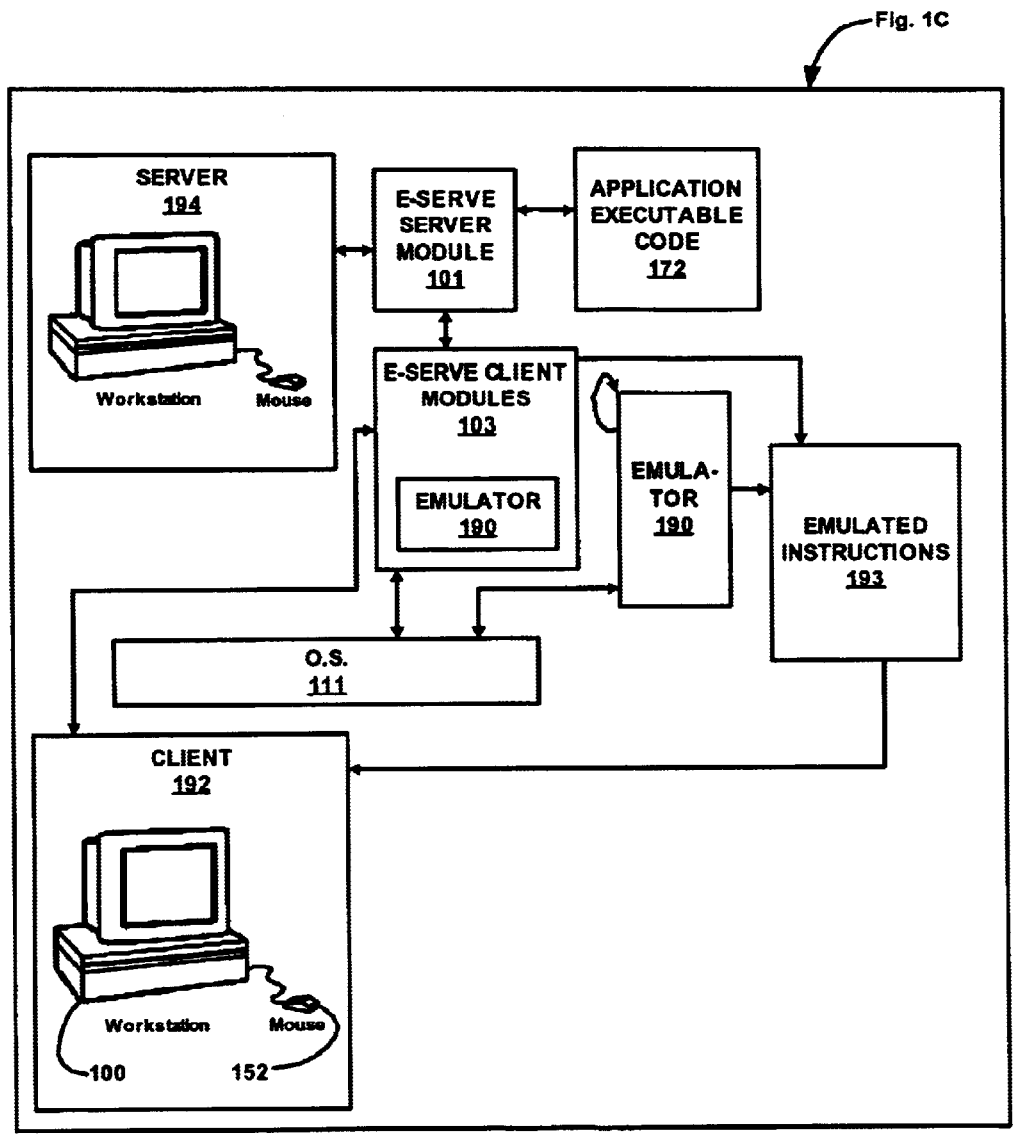
FIG. 1C is a block diagram that illustrates the present embodiment operating as a binary emulator.

FIG. 1B is a block diagram that illustrates the e-serve client modules 103 that load and execute executable code 172 by binary emulation. The present embodiment may operate in cooperation with the O.S. 111 thereby enabling execution of an application 202 (as shown in FIG. 2). It will be appreciated that the present embodiment operates on any computer system 100 and is not limited to the illustration herein. A software developer may create code typically in a high-level programming language such as "C." The code may represent the application 202.

Executable code 172 may be capable of executing on the computer system 100 with I/O devices such as a keyboard 148 (as shown in FIG. 1A) and a mouse 152. It will be appreciated that the input computer system 100 and the output computer system 100 may be the same computer system 100 or different computer systems 100 and are not limited to the configuration illustrated.

The executable code 172 may be any of a variety of known executable files or an executable file of a type to be developed in the future. Examples of such known files are those having an extension of ".exe" operating under a DOS or Windows operating system or an "a.out" file of an O.S. 111 marketed under the trademark UNIX.® Further examples of known files are those having an extension of ".so" that are shared object files and ".sl" that are shared library 206 (as shown in FIG. 2) files.

The e-serve client modules 103 include an e-serve loader 120 that substitutes the operation of the loader 174 thereby loading executable code 172 associated with an application 202 for execution. The e-serve loader 120 loads executable code 172 in the form of code chunks 216 (as shown in FIG. 2). Then the e-serve client modules 103 execute the executable code chunks 216 associated with the application 202 by binary emulation.

FIG. 1C is a block diagram that illustrates the operation of the e-serve client modules 103 that execute code chunks 216 associated with an application 202 (as are shown in FIG. 2) by binary emulation. Thereby the present embodiment substitutes the operations of an emulator 190, such as the product marketed under the trademark JAVA™ Virtual Machine. The e-serve server module 101 may cooperate with a server 194 and the e-serve client module 103 may cooperate with a client 192.

A typical emulator may cooperate with the O.S. 111 and may operate, generally in an iterative manner, to create emulated instructions 193. It will be appreciated that the emulated instructions 193 may be associated with a hardware, software, or firmware representation of a different computer system 100. Further, it will be appreciated that binary emulation is the process of creating new instructions 228 from existing instructions 228. The new instructions 228 may execute on a different computer system 100 than the computer system 100 on which the instructions 228 originally existed.

The e-serve client modules 103 include an emulator 190 that executes the streamed code chunks 216 by binary emulation thereby novelly enabling execution of a partially available application 202. The e-serve server module 101 operates on executable code 172 that is associated with the application 202. The e-serve server module 101 cooperates with the e-serve client modules 103 to stream executable code 172 in the form of code chunks 216 that are associated with the application 202.

FIG. 2 illustrates data structures and modules 227 used by the e-serve modules 102 that may be stored in the memory 106. Further, FIG. 2 represents memory-based computer structures that may be embodied in the memory 106 during the execution of the e-serve modules 102.

The e-serve modules 102 include the e-serve client modules 103 and the e-serve server module 101. The e-serve modules 102 operate to distribute and use portions of a computer-based application 202 over a network 146 (as shown in FIG. 1A). The e-serve server module 101 streams code chunks 216 associated with the application 202 upon request by the e-serve client modules 103. The e-serve client modules 103 execute the code chunks 216 by binary emulation. The e-serve client modules 103 include the e-serve client communication module 107 and the e-serve client emulation module 109. The e-serve client communication module 107 manages the communication between the e-serve server module 101 and other elements of the computer system 100. The e-serve client emulation module 109 manages the binary emulation of the code chunks 216.

The memory 106 may also include elements that enable communication of information between the server 194 and the client 192. For example, e-serve information 352 enables the e-serve client modules 103 to properly use the code chunks 216. The communication path 354 is used for communication of computer-based information. More particularly, the communication path 354 may include the primary communication path 327 and the secondary communication path 331 that enable transmission of information and code associated with the application 202. Also the communication path 354 may include the client communication path 329 that enables information to be transmitted between the e-serve client modules 103 and the e-serve server module 101.

The memory 106 may also include an application 202 that is executed via binary emulation by the e-serve client modules 103. For example an application 202 may be an editing application 202 or an e-mail application 202. Also, an application file 204 that includes code associated with the application 202 may be included in the memory 106.

The memory 106 may include various types of computer-based code such as a code chunk 216, a module 227, an instruction 228, and an address 225. A code chunk 216 is a block of code, data, or a mixture of code and data. A module 227 may refer to a software procedure or function such as a unit of code that may be independently compiled. An instruction 228 may represent a computer address 225 and may also include parameters that are identifiers for values. An address 225 may be a computer hardware register or a location in the memory 106. A value may include integer, real, or complex numbers; or characters, or may be a pointer that references values and thereby provides direction to locate a referenced value.

The memory 106 may also include computer-based tools and code such as a compilation system 108, an emulator 190, and executable code 172. A compilation system 108 translates program code into instructions 228 that operate on the computer system 100. A shared library 206 is typically computer code that may be shared by a number of applications 202 and operates in cooperation with the compilation system 108. An emulator 190 substitutes instructions 228 that may be associated with different computer code or a different computer system 100. Executable code 172 is capable of executing on a multi-purpose computer system 100. A cache 214 is a repository for frequently used code and may be computer memory 106 or another data storage medium.

It will be appreciated that other data structures and modules 227 may be included in the memory during the operation of the present embodiment.

Figure 3A:
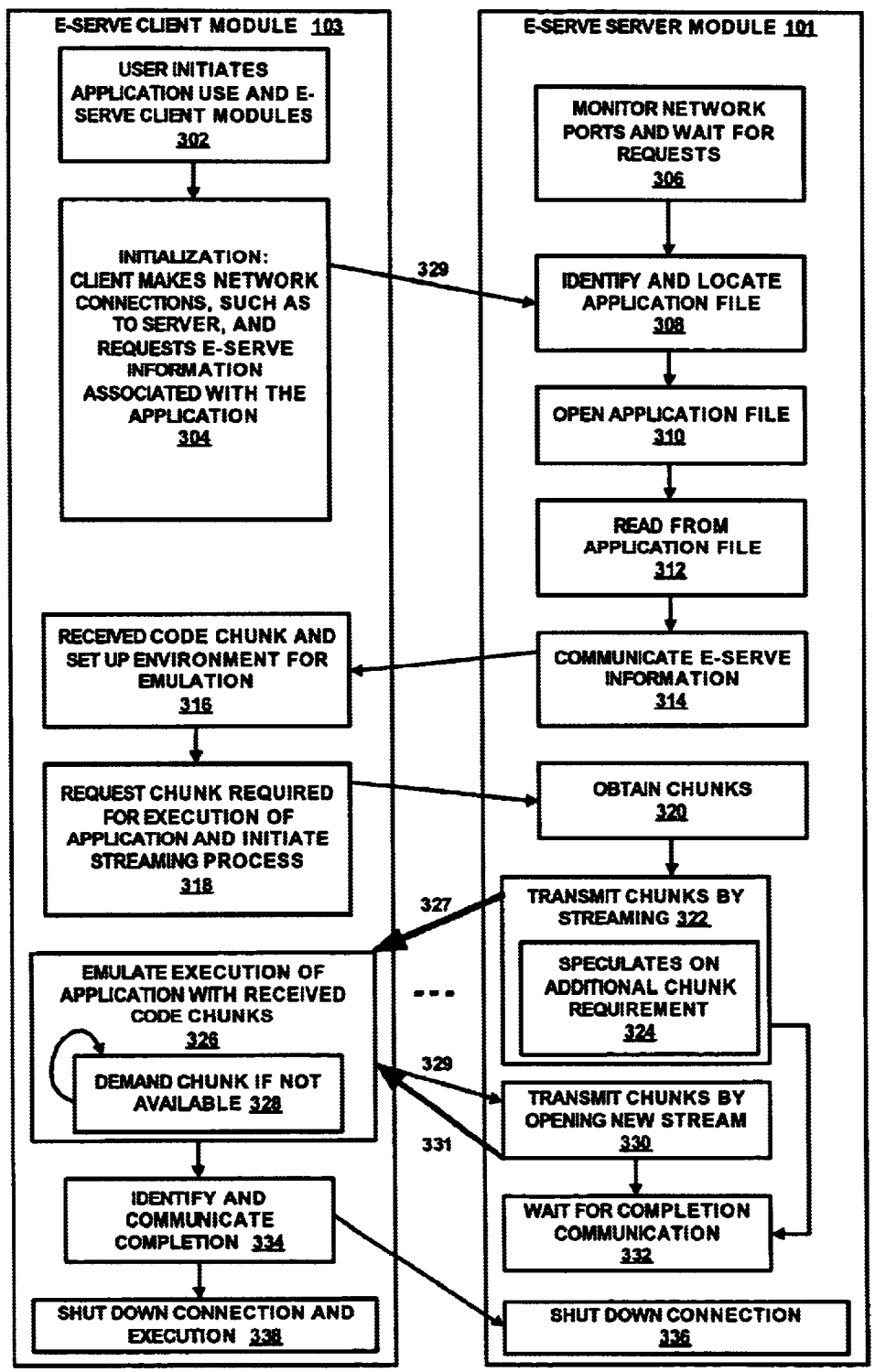
FIG. 3A is a timing diagram that illustrates the method and operation of the present embodiment.

FIG. 3A is a timing diagram that illustrates the method and operation of the present embodiment. As a background activity, the e-serve server module 101 monitors the network 146 (as shown in FIG. 1A) and waits for requests from e-serve client modules 103, as shown in element 306. In the present embodiment a user may initiate the use of an application 202 (as shown in FIG. 2) and thereby initiate the operation of the e-serve client modules 103, as shown in element 302. Then, the e-serve client modules 103 may initialize network 146 connection information for purposes such as establishing network connections between the server 194 and the client 192, as shown in element 304. For example, the e-serve client modules 103 may establish the client communication path, such as a TCP/IP socket connection, as shown in element 329. It will be appreciated that the Transmission Control Protocol/Internet Protocol (TCP/IP) is a common networking protocol used for communication among computer systems 100 that allows uniform formatting of data for transmittal and receipt.

Additionally as shown in element 304, the initialization activity of the e-serve client modules 103 includes requesting information associated with the application 202 often from the e-serve server module 101. That is, the e-serve client modules 103 may establish communication with any apparatus connected to the network 146 that enables transmission to the e-serve client modules 103 of e-serve information 352 (as shown in FIG. 2). The e-serve information 352 enables access to and use of the files associated with the application 202, such as application files 204 (as shown in FIG. 2).

After the e-serve client modules 103 have requested the e-serve information 352 the e-serve server module 101 identifies and locates the application file 204, as shown in element 308. Then the e-serve server module 101 opens the application file 204, as shown in element 310. Next the e-serve server module 101 reads from the application file 204, as shown in element 312. At this point, the e-serve server module 101 may now communicate e-serve information 352 about the application file 204 to the e-serve client modules 103, as shown in element 314. Communicating e-serve information 352 about the application file 204 enables transmission via streaming of the code chunks 216 (as shown in FIG. 2) required for execution of the application 202. For example, the information about the application file 204 may include the size of the code and the size of data associated with the application 202, the location of the application file 204 associated with the code chunk 216, and special information that enables efficient execution of the application 202. The e-serve server module 101 may provide minimal e-serve information 352 when the s-serve client modules 103 operate to manage and control the primary operation of streaming and execution of the application 202.

After an initial code chunk 216 has been received, the e-serve client modules 103 use the e-serve information 352 to set up an environment for binary emulation, as shown in element 316. For example, the e-serve client modules 103 may communicate with the O.S. 111 to allocate the memory 106 (as are shown in FIG. 1A) required to execute the code chunks 216 associated with the application 202. As shown in element 318 the e-serve client modules 103 then request the code chunks 216 required for execution of the application 202 from an apparatus connected to the network such as the server 194 (as shown in FIG. 1C) typically via the e-serve server module 101. This initiates the streaming process.

The terms "stream" or "streaming" refer herein to the transmission of code over a network without first storing the code on a local computer. For example, audio or video information may be sequentially streamed over the internet thereby avoiding the delay related to transferring an entire file to a local computer system 100 (as shown in FIG. 1A) and then playing it with a helper application 202. The present embodiment novelly streams non-sequentially ordered code chunks 216 thereby enabling overlapping of access to and transmission of code chunks 216 with the execution of other code chunks 216.

Upon beginning the streaming process the e-serve server module 101 obtains code chunks 216, as shown in element 320. The e-serve server module 101 then transmits the code chunks 216 by streaming, as shown in element 322. Optionally, the e-serve server module 101 may speculate on additional code chunk 216 requirements as shown in element 324. That is, the e-serve server module 101 may stream additional code chunks 216 that are likely to be required by the e-serve client modules 103. The e-serve server module 101 may speculate by using information about previous use of the application 202.

After receipt of code chunks 216 and the streaming of code has begun, the e-serve client modules 103 emulate execution of the application 202, as shown in element 326. A detailed discussion of emulating execution is provided with reference to FIG. 3B. Emulated execution continues until the application 202 is fully executed. During the process of emulated execution the streaming of a code chunk 216 is demanded if it is not available, as shown in element 328. The primary communication path 354 as shown in element 327 represents the main streaming path for transmission of code over the network 146, such as between the client 192 (as shown in FIG. 1C) and the server 194. There may be many streaming paths for transmission of code and the present invention is not limited to the embodiment represented herein.

If the e-serve client modules 103 determine, as shown in element 328, that a chunk 216 is not available the client communication path 329 may be employed. The client communication path 329 enables the e-serve client modules 103 to request the streaming of required code chunks 216 and as shown in element 330 the e-serve server module 103 transmits code chunks 216 by opening a new stream as shown in element 331. The new stream is a secondary communication path 331 that enables demanded code chunks 216 to be transmitted while allowing the primary communication path 327 to remain available for transmission of other code chunks 216. Thereby the present embodiment novelly enables multiple operations of the e-serve client modules 103, such as emulation and communication, to continue in parallel, often on a multi-processor computer system 100 tailored for parallel execution. Additionally, the present embodiment novelly enables execution of an application 202 with minimal network latency effects. Those skilled in the art will appreciate the effects of network latency.

The e-serve server module O1 waits for completion of communication from the e-serve client modules 103, as shown in element 332. The e-serve client modules 103 identify when the application 202 has completed execution as shown in element 334 and thereupon shut down execution, as shown in element 338. Also the e-serve client modules 103 communicate completion to the e-serve server module 101. Thereupon, the e-serve server module 101 shuts down connections as shown in element 336 and the e-serve client modules 103 shut down connections as shown in element 338.

Figure 3B:
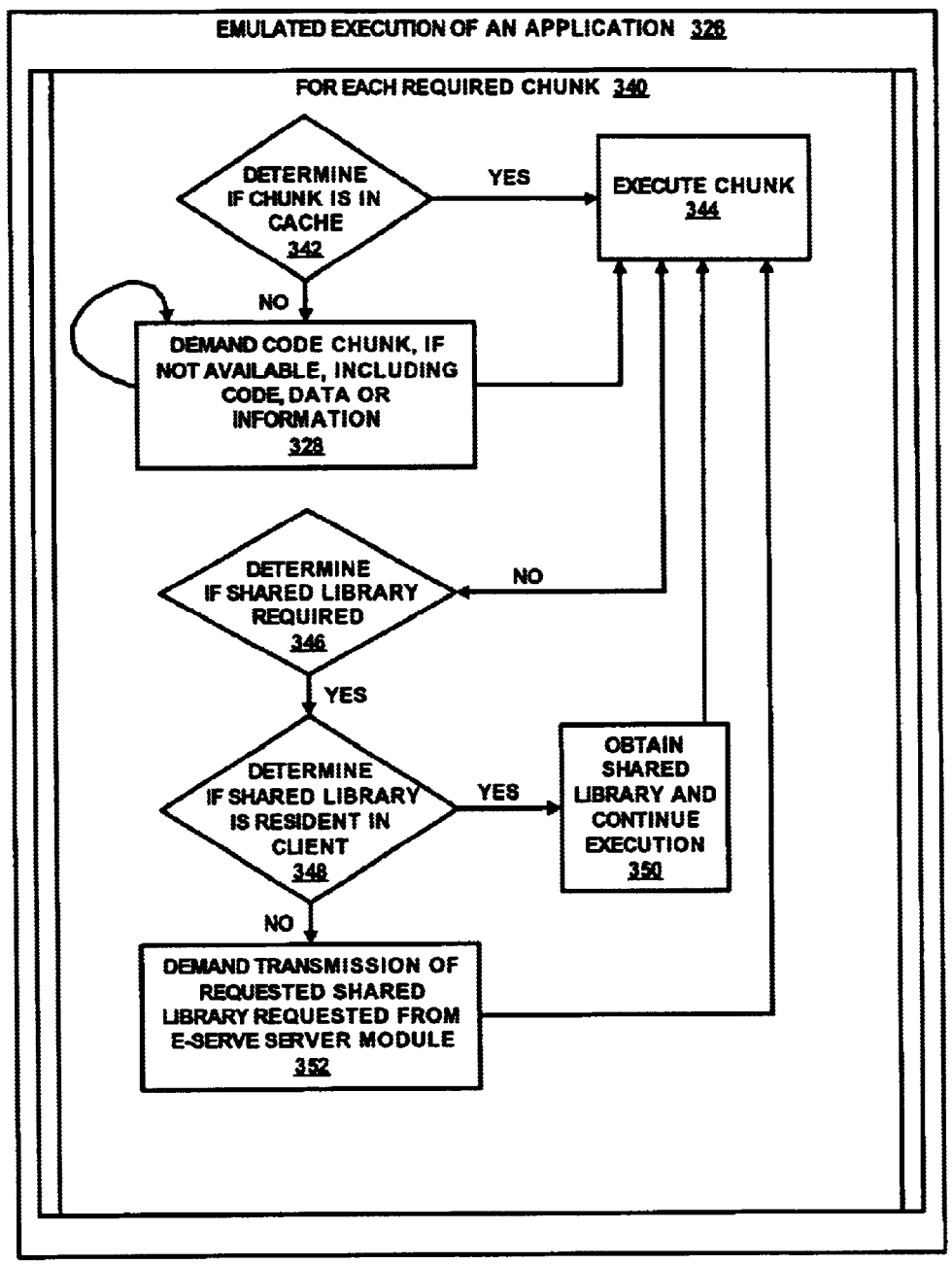
FIG. 3B is a timing diagram that illustrates the operation of emulating application execution.

FIG. 3B is a timing diagram that illustrates emulated execution of the application 202 as shown in element 326. Initially, each required chunk 216 is obtained as shown in element 340. In the present embodiment, the e-serve client modules 103 determine if the code chunk 216 is available by determining if the code chunk 216 is in the cache 214, as shown in element 342. The cache 214 may include the memory 106 or another storage media such as a data storage device 140 (as are shown in FIG. 1A). If the code chunk 216 is not found the present embodiment checks the current stream, such as the primary communication path 327 (as shown in FIG. 3A) to determine if the code chunk 216 is currently being transmitted. If the code chunk 216 is available, the present embodiment executes the code chunk 216 by binary emulation, as shown in element 344. If the code chunk 216 is not available, the e-serve client modules 103 communicate on-demand streaming to the e-serve server module 101 as shown in element 328 and executes the required code chunk 216 upon its receipt as shown in element 344.

During emulated execution the e-serve client modules 103 determine if a shared library 206 is required, as shown in element 346. If a shared library 206 is not required the execution of the code chunk 216 continues, as shown in element 344. If a shared library 206 is required, the e-serve client modules 103 then determine, as shown in element 348, if the shared library 206 is resident on the client 192 (as shown in FIG. 1C). If the test of element 348 is true, then the shared library 206 is obtained by the e-serve client modules 103 and the execution of the code chunk 216 continues, as shown in element 344. If the shared library 206 is not resident on the client 192, then the e-serve client modules 103 request transmission of the shared library 206 from the e-serve server module 101, as shown in element 352. The transmission of the shared library 206 code is similar to the transmission of code chunks 216 associated with the application 202. The execution of the code chunk 216 continues upon receipt of the shared library 206, as shown in element 344.

Figure 4A:
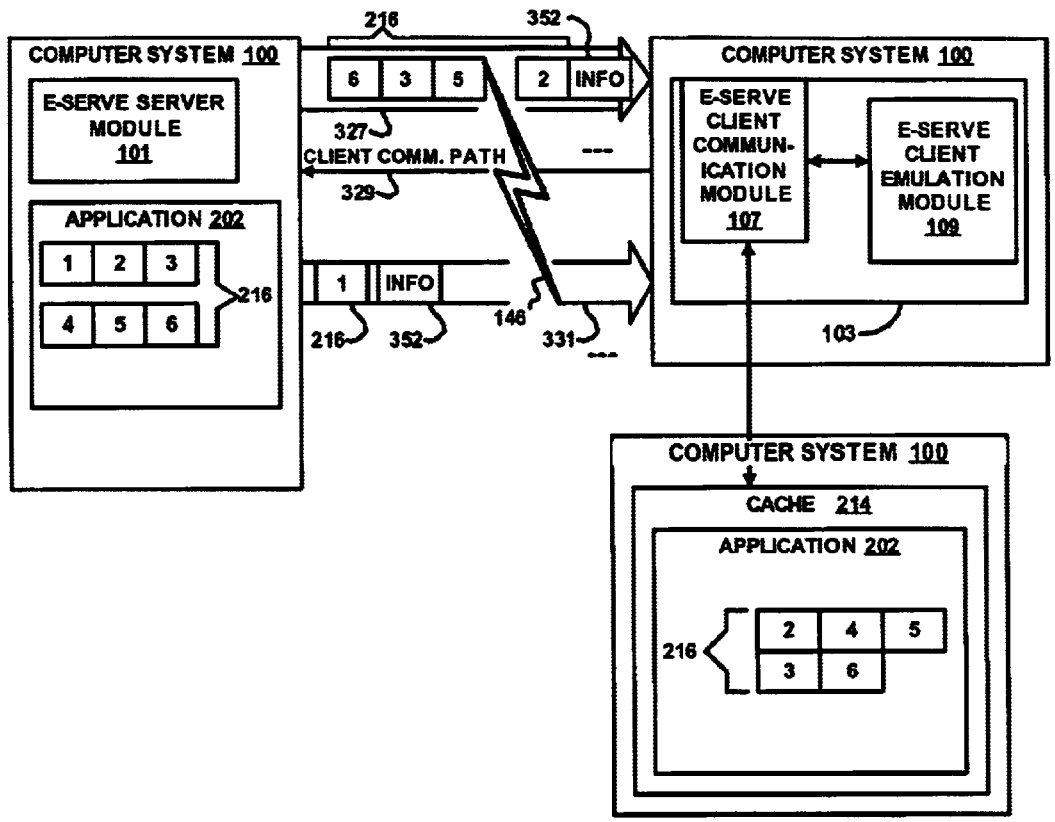
FIG. 4A is a block diagram that illustrates the transmission of chunks over a network by the present embodiment.

FIG. 4A is a block diagram that illustrates the transmission of code chunks 216 over a network 146 by the present embodiment. A computer system 100 having an e-serve server module 101 may also contain an application 202. In the present embodiment, portions of the application 202 are represented by code chunks 216. By means of example, the code chunks 216 are herein identified by the numbers "1," "2," "3," 4," "5," and "6." The e-serve client modules 103 initiate communication with the e-serve server module 101. Then the code chunks 216 associated with the application 202 may be transmitted via the primary communication path 327. Also, e-serve information 352 associated with the code chunks 216 may be transmitted between the e-serve server module 101 and the e-serve client modules 103 thereby enabling use of the associated code chunks 216.

E-serve information 352 may be transmitted over either the client communication path 329, the primary communication path 327, or the secondary communication path 331. E-serve information 352 may include the name of the application file 204 (as shown in FIG. 2) or information required to locate the application file 204. Also, the e-serve information 352 may include the size of the code chunk 216, whether the code chunk 216 includes instructions 228 (as shown in FIG. 2) or data, a list of upcoming code chunks 216 that are also scheduled for transmission, and whether the code chunk 216 was successfully transmitted.

In the present example, the e-serve communication module 107 may need the code chunks 216 labeled "2," "3," "4," "5," and "6" to execute the application 202. If the code chunk 216 labeled "4" was already resident in the available cache 214 then the e-serve client communication module 107 requests the code chunks 216 labeled "2," "3," "5," and "6." The present embodiment may novelly transmit the code chunks 216 in a non-sequential order thereby overlapping access to and transmission of code chunks 216 with execution of other code chunks 216.

During binary execution the e-serve client emulation module 109 may determine that the code chunk 216 labeled "1" is required and will inform the e-serve client communication module 107 so that the code chunk 216 labeled "1" may be obtained from the e-serve server module 101.

In the present example, the e-serve client communication module 107 may request the transmission of the code chunk 216 labeled "1" by the client communication path 329. Then the e-serve server module 101 may transmit the code chunk 216 labeled "1" and its associated e-serve information 352 via the secondary communication path 331 thereby enabling operations to continue on code chunks 216 transmitted over the primary communication path 327. Typically high-level communication protocols are used to ensure proper communication over the communication path 354. More particularly, the communication path 354 may be an X.25 connection, an internet connection, or any means of communicating computer-based information. It will be appreciated by those skilled in the art that an X.25 connection operates via a protocol that describes how data passes into and out of public data communications networks 146.

Figure 4B:
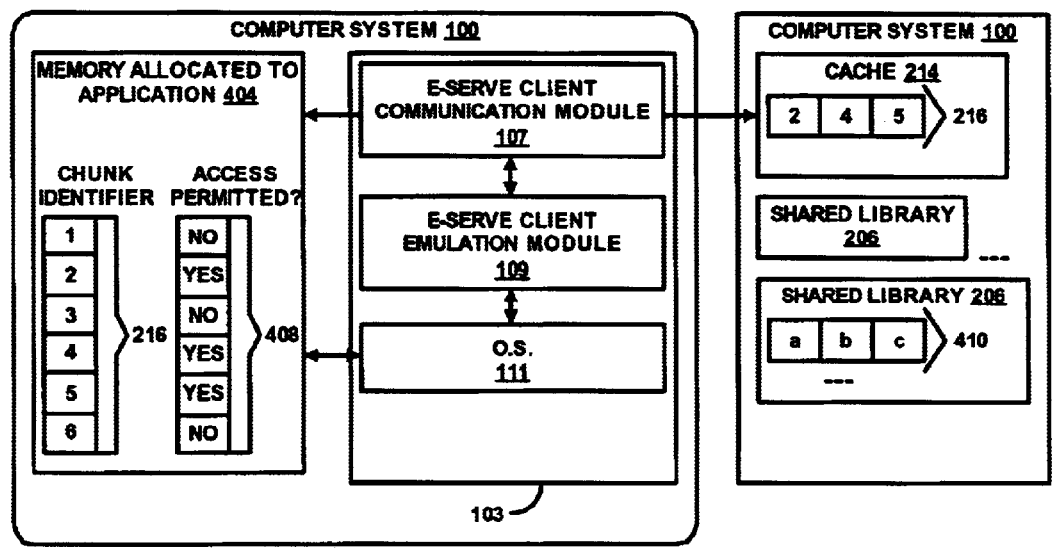
FIG. 4B is a block diagram that illustrates the operation of the storing and obtaining chunks by the present embodiment.

FIG. 4B is a block diagram that illustrates the operation of storing and obtaining code chunks 216 by the present embodiment. The computer system 100 having the e-serve client modules 103 obtains information from the computer system 100 having the e-serve server module 101 (as shown in FIG. 2). Initially in the present embodiment and as shown in element 404, the e-serve client communication module 107 allocates enough memory 106 for all the chunks 216 that may be used during execution of the application 202 (as shown in FIG. 2). Then in the present embodiment, the e-serve client communication module 107 stores the information necessary to obtain each transmitted code chunk 216 in the memory 106 allocated to the application 202 as shown in element 404.

By means of example the memory 106 associated with the code chunks 216 is identified by "1," "2," "3," "4," "5," and "6." In the present embodiment, when the code chunk 216 is actually stored in the memory 106 as shown in element 404 by the e-server client communication module 107 a label 408 is set in the memory 106 indicating that the information associated with the identified code chunk 216 is available in the memory 106. Therefore, access is permitted to the memory location 106 associated with the identified code chunk 216. In the present example the code chunks 216 labeled "2," "4," and "5" have been transmitted and the associated labels 408 indicate that access is permitted to the memory locations 106 associated with the transmitted code chunks 216.

Additionally, in the present embodiment the e-serve client communication module 107 caches the code chunk 216 in cache 214 associated with the computer system 100 thereby enabling reuse of the code chunk 216. Therefore, in the present example the code chunks 216 labeled "2," "4," and "5" have been transmitted and are stored in the cache 214. When the e-serve client emulation module 109 executes the code chunks 216 labeled "2," "4," and "5" the code chunks 216 will be found in the memory allocated to the application 202 as shown in element 404. Also, during a later execution if the code chunks 216 labeled "2," "4," and "5" are required the e-serve client emulation module 109 may reuse these code chunks 216 from the cache 214.

The e-serve client emulation module 109 will perform binary emulation execution of code chunks 216 by cooperation with the operating system 111. In the present embodiment, if a code chunk 216 is required that is not available the e-serve client emulation module 109 will still attempt to obtain the code chunk 216. A communication from the O.S. 111 will be sent to the e-serve client emulation module 109, such as a "SIGBUS" signal or a "SIG_SEGV" signal, that indicate that the memory 106 associated with the requested code chunk 216 has a "no access" label. This information will trigger a request from the e-serve client emulation module 109 to the e-serve client communication module 107 for transmission of the required code chunk 216. Those skilled in the art will appreciate the use of the "SIGBUS" and "SIG_SEGV" signals that are associated with the O.S. 111 marketed under the trademark UNIX.™

The execution of code may require information from shared libraries 206. These libraries may also be stored on a computer system 100 that is accessible to the e-serve client modules 103. Therefore, if a shared library 206 is not available during binary emulation execution, the e-serve client emulation module 109 may request transmission of the shared library 206 from the e-serve client communication module 107 in the same manner used to request transmission of a code chunk 216. By means of example, code segments 410 labeled "a," "b," and "c" that are included in the shared library 206 may be transmitted by streaming in the present embodiment.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. The flow charts of the present embodiment show the architecture, functionality, and operation of an implementation of the present embodiment. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

Thus, the foregoing descriptions of specific embodiments of the e-serve modules are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A method in a computer system for executing an application on a client computer system, said application being included in a server computer system and said application including computer-readable code, wherein said code is arranged in programmed order, and said application further including at least one chunk of said code, said method comprising:

connecting said client and said server to a network; and said client:

requesting said chunks required to execute said application in non-sequential order with respect to said programmed order, from said server via said network, wherein said chunks comprise code implemented in a computer-executable language selected from the group consisting of C Language and another language;

receiving said chunks via streaming from said server; and emulating execution of said chunks thereby executing said application.

2. A method in a computer system for executing an application on a client computer system, said application including computer-readable code, wherein said code is arranged in a programmed order, said method comprising:

connecting said client to a network;

connecting said network to a server computer system including said application;

establishing communication between said server and said client via said network;

monitoring said network by said server for requests from said client;

requesting at least one chunk of said code, wherein said chunk is included in said application, wherein said chunk comprises code implemented in a computer-executable language selected from the group consisting of C Language and another language, and wherein said chunk is required to execute said application by said client from said server;

identifying and locating said chunks by said server;

streaming said chunks in non-sequential order, with respect to said programmed order, to said client by said server;

emulating execution of said chunks by said client thereby executing said application; and communicating completion of execution of said application to said server thereby shutting down connection between said client and said server.

3. The method as set forth in claim 2 wherein streaming of said chunks further comprises speculatively streaming said chunks by said server to said client thereby improving efficiency of execution of said application, wherein said speculative streaming comprises a streaming process selected from the group consisting essentially of prefetching, and executing out of order.

4. The method as set forth in claim 2 wherein said application executes in cooperation with a shared library, said method further comprising:
   locating said shared library by said server;
   transmitting said shared library to said client; and
   including said shared library during execution of said application thereby executing said application in cooperation with said shared library.

5. The method as set forth in claim 2 wherein said client caches said transmitted chunks thereby enabling reuse of said chunks.

6. An apparatus for executing an application on a client computer system, said application being included in a server computer system and said application including computer-readable code, wherein said code is arranged in a programmed order and said application further including at least one chunk of said code, said apparatus comprising:
   a network being connected to said client and said server; and
   a memory incorporated into said client computer system, said memory comprising an e-serve module, wherein said e-serve module is implemented in a computer-executable language selected from the group consisting of C Language and another language;
   said client requesting and receiving from said server via said network said chunks that are streamed in non-sequential order, with respect to said programmed order, and that are required to execute said application wherein said chunks comprise code implemented in a computer-executable language selected from the group consisting of C Language and another language; and
   said chunks being executed by emulation and by said client.

7. An apparatus for executing an application on a client computer system, said application including computer-readable code, wherein said code is arranged in programmed order, said apparatus comprising:
   a network connected to said client;
   a server computer system connected to said network, said server including said application, communicating with said client via said network, and monitoring said network for requests from said client; and
   at least one chunk of said code, wherein said chunk is included in said application that is required to execute said application being streamed in non-sequential order, with respect to said programmed order by said server to said client, and said chunks being executed by said client by emulation and wherein said chunks comprise code implemented in a computer-executable language selected from the group consisting of C Language and another language.

8. The apparatus as set forth in claim 7 further comprising wherein said chunks being streamed speculatively thereby improving efficiency of execution of said application, wherein said speculative streaming comprises a streaming process selected from the group consisting essentially of prefetching, and executing out of order.

9. The apparatus as set forth in claim 7 including a shared library further comprising said shared library being included during execution of said application thereby executing said application in cooperation with said shared library.

10. The apparatus as set forth in claim 7 further comprising said chunks being cached thereby enabling reuse of said chunks.

11. A computer-readable medium containing instructions for causing a computer system to perform method acts for executing an application on a client computer system, said application being included in a server computer system and said application including computer-readable code, wherein said code is arranged in programmed order and said application further including at least one chunk of said code, said method acts comprising:
   connecting said client and said server to a network; and
   said client:
      requesting said chunks required to execute said application in non-sequential order, with respect to said programmed order, from said server via said network, wherein said chunks comprise code implemented in a computer-executable language selected from the group consisting of C Language and another language;
      receiving said chunks via streaming from said server; and
      emulating execution of said chunks thereby executing said application.

12. A computer-readable medium containing instructions for causing a computer system to perform method acts for executing an application on a client computer system, said application including computer-readable code, wherein said code is arranged in a programmed order, said method acts comprising:
   connecting said client to a network;
   connecting said network to a server computer system including said application;
   establishing communication between said server and said client via said network;
   monitoring said network by said server for requests from said client;
   requesting at least one chunk of said code, wherein said chunk is included in said application that is required to execute said application by said client from said server wherein said chunks comprise code implemented in a computer-executable language selected from the group consisting of C Lanauage and another language;
   identifying and locating said chunks by said server;
   streaming said chunks in non-sequential order, with respect to said programmed order, to said client by said server;
   emulating execution of said chunk by said client thereby executing said application; and
   communicating completion of execution of said application to said server thereby shutting down connection between said client and said server.

13. The method acts as set forth in claim 12 wherein streaming of said chunks further comprises speculatively streaming said chunks by said server to said client thereby improving efficiency of execution of said application, wherein said speculative streaming comprises a streaming process selected from the group consisting essentially of prefetching, and executing out of order.

14. The method acts as set forth in claim 12 wherein said application executes in cooperation with a shared library, said method acts further comprising:
   locating said shared library by said server;
   transmitting said shared library to said client; and including said shared library during execution of said application thereby executing said application in cooperation with said shared library.

15. The method acts as set forth in claim 12 wherein said client caches said transmitted chunks thereby enabling reuse of said chunks.

16. An article of manufacture comprising a program storage medium having computer-readable code embodied therein for executing an application on a client computer system, said application being included in a server computer system and said application including computer-readable code, wherein said code is arranged in a programmed order and said application further including at least one chunk of said code, said article of manufacture comprising:

computer-readable program code for connecting a network to said client and said server;

computer-readable program code for requesting and receiving from said server to said client via said network said chunks that are streamed in non-sequential order, with respect to said programmed order, and that are required to execute said application, wherein said chunks comprise code implemented in a computer-executable language selected from the group consisting of C Language and another language; and computer-readable program code for executing by said client of said chunks by emulation.

17. An article of manufacture comprising a program storage medium having computer-readable code embodied therein for executing an application on a client computer system, said application being included in a server computer system and said application including computer-readable code, wherein said code is arranged in a programmed order, said article of manufacture comprising:

computer-readable program code for connecting a network to said client;

computer-readable program code for connecting said network to a server computer system, said server including said application, communicating with said client via said network, and monitoring said network for requests from said client;

computer-readable program code for including in said application at least one chunk of said code, wherein said chunk is included in said application, wherein said chunk is required to execute said application, and wherein said chunk comprises code implemented in a computer-executable language selected from the group consisting of C Language and another language; and computer-readable program code for streaming by said server to said client said chunks in non-sequential order, with respect to said programmed order; and computer-readable program code for executing said chunks by said client by emulation.

18. A computer-readable data transmission for executing an application on a client computer system, said application being included in a server computer system and said application including computer-readable code, wherein said code is arranged in programmed order and said application further including at least one chunk of said code, said data transmission comprising:

a first portion connecting said client and said server to a network;

a second portion requesting by said client said chunks required to execute said application in non-sequential order, with respect to said programmed order, from said server via said network wherein said chunks comprise code implemented in a computer-executable language selected from the group consisting of C Language and another language;

a third portion receiving said chunks by said client from said server via streaming; and a fourth portion emulating execution of said chunks by said client thereby executing said application.

19. A computer-readable data transmission for executing an application on a client computer system, said application including computer-readable code, wherein said code is arranged in a programmed order, said data transmission comprising:

a first portion connecting said client to a network;

a second portion connecting said network to a server computer system including said application;

a third portion establishing communication between said server and said client via said network;

a fourth portion monitoring said network by said server for requests from said client;

a fifth portion requesting by said client from said server at least one chunk of said code, wherein said chunk is included in said application, wherein is required to execute said application, wherein said chunks comprise code implemented in a computer-executable language selected from the group consisting of C Language and another language;

a sixth portion identifying and locating said chunks by said server;

a seventh portion streaming said chunks in non-sequential order to said client by said server;

an eighth portion emulating execution of said chunks by said client thereby executing said application; and a ninth portion communicating completion of execution of said application to said server thereby shutting down connection between said client and said server.

* * * * *